US005686936A

United States Patent [19]

Maekawa et al.

[11] Patent Number: 5,686,936

[45] Date of Patent: Nov. 11, 1997

[54] ACTIVE MATRIX DISPLAY DEVICE AND METHOD THEREFOR

[75] Inventors: Toshikazu Maekawa; Katsuhide Uchino, both of Kanagawa, Japan

[73] Assignee: Sony Corporation, Japan

[21] Appl. No.: 423,866

[22] Filed: Apr. 18, 1995

[30] Foreign Application Priority Data

Apr. 22, 1994 [JP] Japan .................................... 6-107598

[51] Int. Cl.[6] ................................ G09G 3/36; H04N 3/14

[52] U.S. Cl. ............................ 345/100; 345/94; 345/208; 348/792

[58] Field of Search ................................ 345/55, 60, 74, 345/76, 78, 82, 90, 92, 94, 99, 103, 100, 204, 208, 214, 197, 215; 348/790, 791, 792, 793, 800, 801, 802, 803; H04N 3/14, 3/15

[56] References Cited

U.S. PATENT DOCUMENTS 4,366,504 12/1982 Kanatani ................................ 348/800
4,789,899 12/1988 Takahashi ................................ 348/793
4,866,348 9/1989 Harada et al. ........................ 345/209
5,040,874 8/1991 Fukuda .................................... 348/793
5,091,722 2/1992 Kitajima et al. ...................... 348/792
5,252,957 10/1993 Itakura .................................... 345/98
5,379,050 1/1995 Annis et al. ............................ 345/94
5,426,447 6/1995 Lee ........................................ 345/103
5,552,677 9/1996 Pagones .................................. 345/76

FOREIGN PATENT DOCUMENTS 0287055 10/1988 European Pat. Off. ............... 345/100
0622772 11/1994 European Pat. Off. ............... 345/100
2843801 4/1979 Germany .
3511886 10/1985 Germany .
2008813 1/1990 Japan .
2204718 8/1990 Japan .
3235989 10/1991 Japan .................................... 345/100
2081018 2/1982 United Kingdom .

*Primary Examiner*—Richard Hjerpe
*Assistant Examiner*—Kara Farnandez Stoll
*Attorney, Agent, or Firm*—Ronald P. Kananen

[57] ABSTRACT

To restrict a potential oscillation in a video line caused by a high speed sampling rate, the active matrix display device is comprised of gate lines X in row, signal lines Y in column and liquid crystal pixels LC of matrix arranged at each of the crossing points of both lines. The V driver 1 scans in line sequence each of the gate lines X and selects the liquid crystal pixels LC in one line for every one horizontal period. The H driver 2 performs in sequence samplings of the video signal VSIG within one horizontal scanning period to each of the signal lines Y and performs a writing of the video signal VSIG by dot sequential scanning to the liquid crystal pixels LC in one selected line. The precharging means 4 supplies in sequence the predetermined precharging signal VPS prior to the sequential sampling of the video signal VSIG for each of the signal lines Y. This precharging means 4 is comprised of a plurality of switching elements PSW connected to an end part of each of the signal lines Y, and of the P driver 5 for supplying the precharge signal VPS to each of the signal lines Y through sequential controlling of ON or OFF of each of the switching elements PSW.

11 Claims, 8 Drawing Sheets

ACTIVE MATRIX DISPLAY DEVICE AND METHOD THEREFOR

BACKGROUND OF THE INVENTION

1. Field of the Invention

This invention relates to an active matrix display device and its driving method. More particularly, this invention relates to the use of anti-potential oscillation technology in a video line in a spot sequential driving operation.

2. Description of Related Art

Referring now to FIG. 8, the configuration of the prior art active matrix display device will be briefly described. In this arrangement the active matrix display device is comprised of gate lines X (rows), signal lines Y (columns) and liquid crystal pixels LC arranged in a matrix at each of the junctions or crossing points of the lines. Each of the liquid crystal pixels LC is driven by a thin film transistor Tr. A V driver (a vertical scanning circuit) 101 performs a sequential line scanning of each of the gate lines X and selects the liquid crystal pixel LC on one line each horizontal period (1H). The H driver (a horizontal scanning circuit) 102 sequentially samples the video signals VSIG appearing on each of the signal lines Y during each horizontal period (1H) and writes the video signals VSIG in the liquid crystal pixels LC in one selected line in spot sequence. More specifically, each of the signals lines Y is connected to the video line through the horizontal switch HSW, receives the video signal VSIG from the signal driver 103 and in turn the H driver 102 outputs horizontal sampling pulses $\phi_{H1}$, $\phi_{H2}$, $\phi_{H3}$, . . . $\phi_{HN}$ in sequence and controls the ON/OFF state of each of the horizontal switches HSW.

FIG. 9 expresses waveforms of sampling pulses. As the active matrix display device is intended to be highly accurate in operation, the sampling rate is fast. However, this results in the sampling pulse width $\tau_H$ becoming erratic. As the sampling pulse is outputted, its corresponding horizontal switch ESW is turned on or off and the video signal VSIG from the video line is sampling held in the corresponding signal line Y. Each of the signal lines Y has a capacitance component and its charging or discharging is controlled by the sampling of the video signal VSIG. As a result, the potential in the video line varies. As described above, as the sampling rate is fast, the sampling pulse width $\tau_H$ is erratic, so that a charging or discharging in respect to each of the signal lines Y is not constant and the potential in the video line fluctuates. This induces the drawback that this produces vertically fixed pattern and remarkably degrades quality of the displayed video image. With normal NTSC Standards, the sampling rate is relatively low and exhibits a timing wherein each successive sampling pulse is generated after the potential oscillation in the video line has ceased, so that a vertical fixed pattern does not appear due to the absence of any detrimental influence by the previous signal line. However, in the case of HDTV or a double-speed NTSC, the sampling rate is rapid and effective attenuation of a potential oscillation in the video line is difficult to achieve. The sampling pulse is, in general, generated by the H driver comprised of TFT type shift registers or the like. Since TFT have a lower mobility as compared with that of monolithic silicon transistors and also have a higher disturbance in each of the physical constants, it is difficult to accurately control the sampling pulses generated by this circuit. In addition, a certain disturbance may occur in ON resistance of the horizontal switch HSW in addition to the disturbance of the sampling pulse width. With such an arrangement, a variation occurs in the charging and/or discharging characteristics of the signal line Y and the video line potential accordingly fluctuates. This fluctuation tends to overlap the actual video signal VSIG and appears as a vertical line causing a remarkable reduction in the quality of the displayed video signal.

SUMMARY OF THE INVENTION

In view of the aforesaid technical problems encountered with the prior art, it is an object of the present invention to provide effective attenuation of a potential oscillation in the video line generated as the sampling rate is increased. In order to accomplish the aforesaid object, the present invention is provided with the following means. That is, the active matrix display device of the present invention is provided with gate lines in rows, signal lines in columns and matrix pixels arranged at each of the line junctions, as its basic configuration. In addition, there is also provided a vertical scanning circuit, wherein each of the gate lines is sequentially scanned and the pixels in that line are selected each horizontal period. There is also provided a horizontal scanning circuit, wherein the video signals are sampled in sequence at each of the signal lines within one horizontal period, and writes video signals by dot sequential scanning on a selected pixel in that line. As a feature of the present invention, there is provided a precharging means which supplies predetermined precharging signals in sequence to each of the signal lines one sampling period prior to the sequential sampling of the video signal corresponding to the selected signal line.

More specifically, the aforesaid precharging means is comprised of a plurality of switching elements connected to each of the terminal ends of the respective signal lines and a control means for controlling in sequence the ON/OFF state of each of the switching elements and supplying a precharging signal to each of the signal lines. This control means is comprised of an additional horizontal scanning circuit separately installed from the horizontal scanning circuit, wherein each of the switching elements is controlled in sequence with respect to its ON/OFF state. Alternatively, the control means may be constructed such that its output is distributed and each of the switching elements is controlled in sequence with respect to its ON/OFF state.

The precharging means supplies a precharging signal having a voltage which corresponds to a grey level and which is therefore intermediate of the white and black level of the video signal. The precharging means is preferably arranged to supply a precharging signal having the same polarity as the waveform of the video signal.

A further aspect of the invention resides in a method of driving the active matrix display device. That is, the driving method in accordance with the present invention is characterized in that it performs a vertical scanning for scanning linearly in sequence of each of the gate lines and selecting pixels in one line for every one horizontal period, a horizontal scanning for sampling in sequence the video signals in one horizontal period to each of the signal lines and writing the video signals by dot sequential scanning to the pixels in one selected line, and a precharging for supplying in sequence a predetermined precharging signal to each of the signal lines prior to the sequential sampling of the video signals in respect to each of the signal lines.

According to the present invention, the charging or discharging of each of the signal lines is essentially completed by the precharging signal, and the charging or discharging by the sampling of the video signals is carried out such that involves only the difference between the precharging level and the signal level. Accordingly, the potential oscillation in the video line caused by supplying the video signals is attenuated as compared with that of the prior art, and the vertical fixed pattern which plagues video quality, is eliminated. In particular, in accordance with the present invention, the precharged signals are sampled by so-called dot sequential scanning of each of the signal lines. As compared with the case wherein the precharged signals are simultaneously sample held in all signal lines, the potential oscillation at the gate lines or power source line can be reduced. In addition, a reduced driving capability of the precharging means is also rendered possible.

DESCRIPTION OF THE PREFERRED EMBODIMENT

Figure 1:
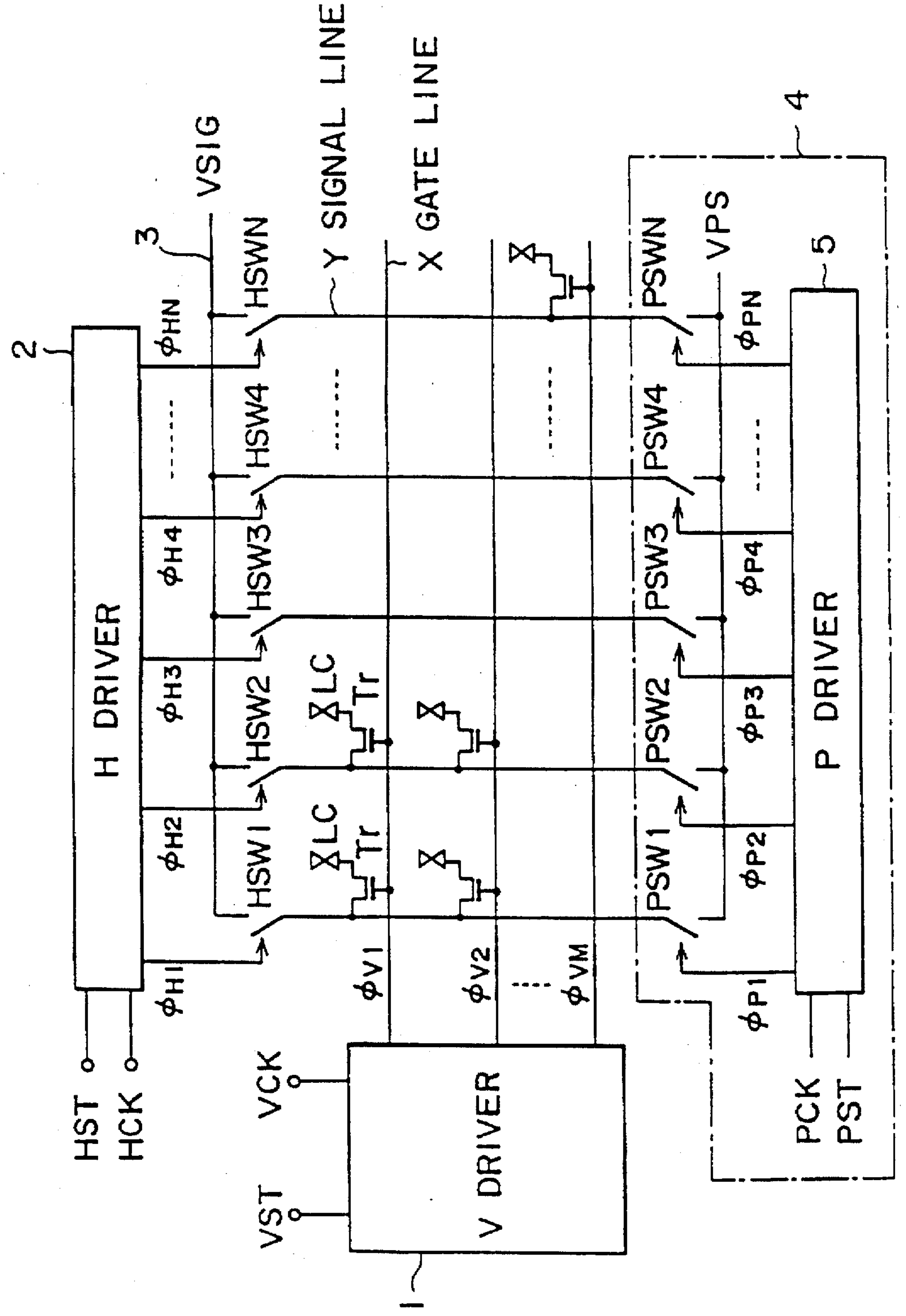
FIG. 1 is a circuit diagram showing a first embodiment of the active matrix display device according to the present invention.

Referring now to the drawings, the preferred embodiments of the present invention will be described in detail. FIG. 1 is a circuit diagram showing a first embodiment of the active matrix display device of the present invention. The active matrix display device is comprised of gate lines X in rows, signal lines Y in columns and liquid crystal pixels LC in matrix arranged at each of the crossing points in both lines. In this embodiment, there are provided pixels LC utilizing liquid crystal as electro-photo substance. However, the present invention is not limited to this embodiment, and other electro-optical substances may be utilized. Thin film transistors Tr are used for driving each of the liquid crystal pixels LC. The source electrode of the thin film transistor Tr is connected to the corresponding signal line Y, the gate electrode is connected to the corresponding gate line X and the drain electrode is connected to the corresponding liquid crystal pixel LC.

There is provided a V driver 1 so as to constitute the vertical scanning circuit, and each of the gate lines X are scanned one line at a time and a liquid crystal pixel LC in one line is selected each horizontal period. More specifically, the V driver 1 transfers the vertical start signal VST in sequence synchronously with the vertical clock signal VCK and outputs the selection pulses $\phi_{V1}$, $\phi_{V2}$, . . . $\phi_{VM}$ to each of the gate lines X. With such an arrangement, the ON/OFF state of the thin film transistor Tr is controlled.

In addition, a H driver 2 (horizontal scanning circuit) supplies video signals VSIG in sequence to each of the signal lines in one horizontal period. The video signals VSIG are written by dot sequential scanning to the liquid crystals LC of the selected line. More specifically, one end of each of the signal lines Y is provided with horizontal switching elements HSW1, HSW3, HSW4, . . . HSWN, connected to each of the video lines 3 so as to receive the video signals VSIG. In turn, the H driver 2 sequentially transfers the horizontal start signal HST in synchronous with the predetermined horizontal clock signal HCK and outputs the sampling pulses $\phi_{H1}$, $\phi_{H2}$, $\phi_3$ . . . $\phi_{HN}$. These sampling pulses control the ON/OFF state of the corresponding horizontal switching elements and sample holds the video signals VSIG to each of the signal lines Y.

As a feature of the present invention, a precharging means 4 sequentially supplies a predetermined precharging signal VPS to each of the signal lines Y prior to the sequential sampling of the video signal VSIG with respect to each of the signal lines Y. Accordingly, charging or discharging of each of the signal lines Y through sampling is attenuated. With such an arrangement as above, a smaller potential oscillation in the video line 3 occurs. More specifically, the precharging means 4 has additional switching elements PSW1, PSW2, PSW3, PSW4, . . . connected to the terminal end of each of the signal lines Y. In addition, there is provided a P driver 5 in the form of a control means for sequentially controlling the ON/OFF state of the additional switching elements PSW and supplying the precharging signal VPS to each of the signal lines Y. The P driver 5 has a similar configuration to that of the H driver 2, wherein the horizontal start signal PST is transferred sequentially and synchronously with the horizontal clock signal PCK, and subsequently outputs precharging sampling pulses $\phi_{P1}$, $\phi_{P2}$, $\phi_{P3}$ . . . $\phi_{PN}$. The additional horizontal switching elements PSW are sequentially controlled to their ON/OFF states in response to these precharging sampling pulses. In this embodiment, the control means is comprised of the horizontal scanning circuit having the additional P driver 5 separate from the H driver 2, wherein each of the switching elements PSW is sequentially controlled to its appropriate ON/OFF state. In addition, the horizontal scanning circuit such as the H driver 2 or the P driver 5 has as its basic configuration shift registers, wherein either the thin film transistors or monolithic silicon transistors are integrated. The switching element HSW for the video signal sampling or the switching element PSW for the precharging signal sampling can be constructed by NMOS, PMOS and CMOS. In the preferred embodiment, although the H driver 2 and the P driver 5 are separately arranged at both ends of the signal line Y, the H driver 2 and the P driver 5 may be integrated at the same side. In this case, the horizontal switches HSW and PSW are also arranged at one end of the signal line Y.

Figure 2:
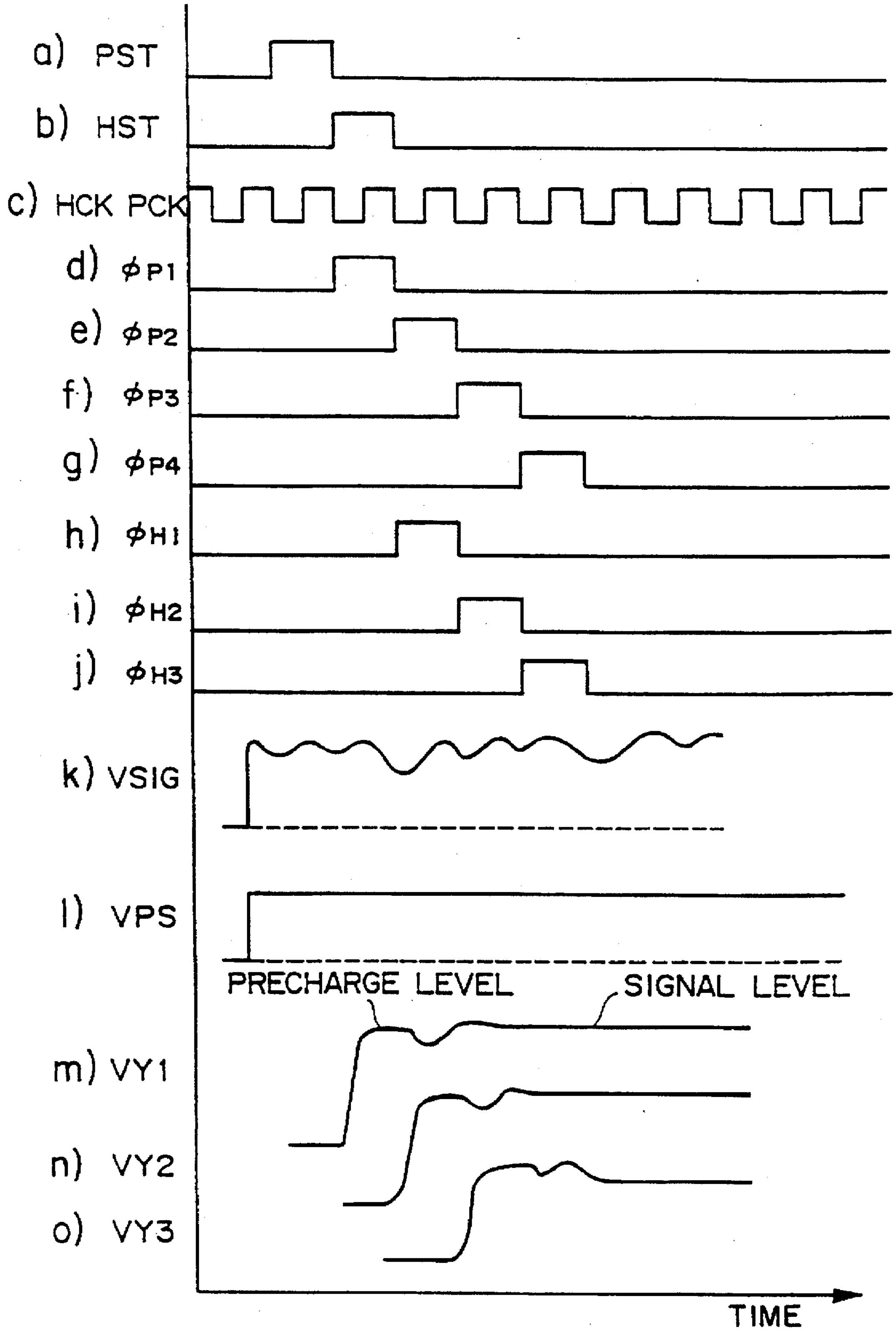
FIG. 2 is a timing chart illustrating the operation of the first embodiment.

Referring to FIG. 2, operation of the active matrix display device shown in FIG. 1 will be described in detail. As described above, the P driver 5 transfers in sequence the start signal PST in synchronism with the horizontal clock signal PCK and outputs the precharging sampling pulses $\phi_{P1}$, $\phi_{P2}$, $\phi_{P3}$, and $\phi_{P4}$. Similarly, the H driver 2 also transfers the horizontal start signals HST synchronously with the horizontal clock signal HCK and outputs the sampling pulses $\phi_{H1}$, $\phi_{H2}$, and $_{H3}$. In this embodiment, the same horizontal clock signal is used as signals HCK and PCK. The horizontal start signal is generated such that its PST is generated first and is followed by the generation of the HST. With such an arrangement, the sampling pulse for the precharging signal is always advanced by 1 sampling timing with respect to the sampling for the video signal.

The video signal VSIG is supplied to the H driver 2 and a precharging signal VPS is supplied to the P driver 5. As shown in the timing chart of FIG. 2, the video signal VSIG has a waveform varying between a white level and a black level. In turn, the precharging signal VPS has a specified potential corresponding to a grey level. In light of this state, the precharging signal VPS having the same polarity and the same waveform as those of the video signal VSIG may be used. Applying the same waveform in VSIG and VPS remarkably reduces the charging or discharging amount at the signal line and the potential oscillation at the video line 3 can be effectively attenuated. Provided, in the case that the same waveform is used in VSIG and VPS, the signal is not branched from the common video driver, and it is necessary to prepare a separate signal source. In turn, in the case that the specified voltage waveform of grey level is used as the precharging signal, a slight charging or discharging usually takes place at the sampling time of the video signal, although the charging or discharging amount of the signal line is remarkably reduced as compared with that of the case in which the video signal having an opposite polarity such as occurs in the case of 1H reversing driving operation.

At the lowest stage of the timing chart shown in FIG. 2 are expressed variations of potentials VY1, VY2 and VY3 of each of the signal lines Y. Taking account of the initial signal line Y1 shows that $\phi_{P1}$ is outputted before $\phi_{H1}$, the precharging level is sampled at first at the signal line Y1 and is followed by the video signal level being sampled. This operation is performed in sequence to the second and subsequent signal lines to enable a high quality image having no vertical stripe to be displayed. In the present invention, the charging or discharging to Y1, Y2, Y3 . . . are almost completed due to the precharging and the charging or discharging with VSIG is limited to the relatively small difference between the precharging level and the video signal level. The precharging signal VPS is sampled by so-called dot sequential scanning to each of the signal lines Y. Merits of this system reside in that the precharging signal VPS is sample held at all signal lines, resulting in that the voltages at the gate line X and the power source line do not fluctuate. Since the load capacity, as viewed from the line of the precharging signal VPS, is reduced, a resistance in the precharging signal line, a size of the added switching element PSW, and the driving capacity of the P driver and the like, can be reduced.

In this first embodiment, although the vertical scanning circuit is constructed to output selection pulses to gate lines in such a manner that each of the gate lines is scanned in sequence in a linear manner and some pixels in one line are selected for every horizontal period, it may also be applicable that the pixels in two or more lines are concurrently selected.

Figure 3:
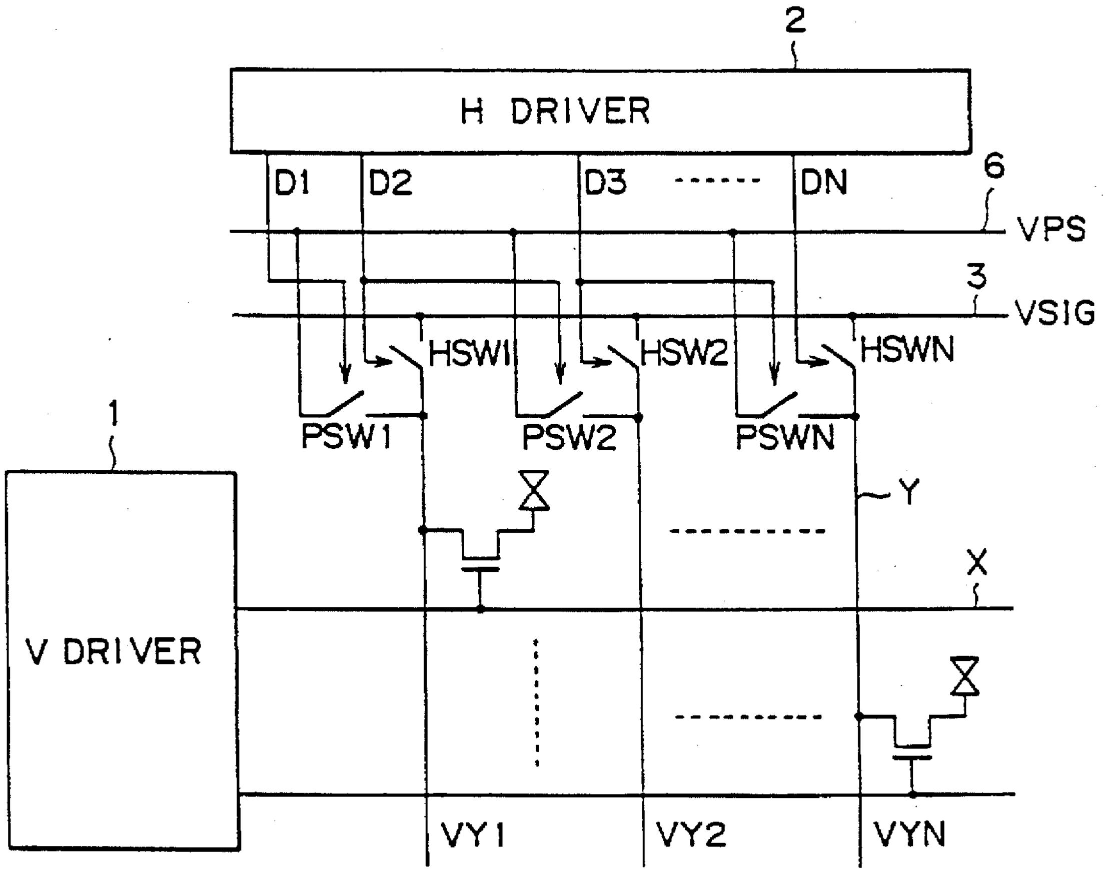
FIG. 3 is a circuit diagram showing a second embodiment of the active matrix display device of the present invention.

FIG. 3 is a circuit diagram showing a second preferred, embodiment of the active matrix display device according to the present invention. Basically, the second preferred embodiment has the similar configuration to that of the first preferred embodiment shown in FIG. 1, wherein the corresponding reference numerals are used to denote corresponding portions elements. In this second embodiment, one end of each of the signal lines Y is provided with the sampling switching element HSW for the video signal VSIG and the sampling switching element PSW for the precharging signal VPS. The ON/OFF states of these switching elements HSW and PSW are commonly controlled by the H driver 2. That is, this second embodiment is different from the first embodiment, in that the P driver, used in the sampling hold of the precharging signal VPS, is eliminated and the circuit configuration is made more simple. A sampling pulse D outputted from each of the stages of the H driver 2 is applied for use in controlling the ON/OFF state of HSW corresponding to each of the stages and concurrently controls the ON/OFF state of the PSW of the next stage. In other words, the control means is incorporated into the horizontal scanning circuit, and its sampling pulse output is distributed to control the ON/OFF sequence of each of the switching elements HSW, PSW.

Figure 4:
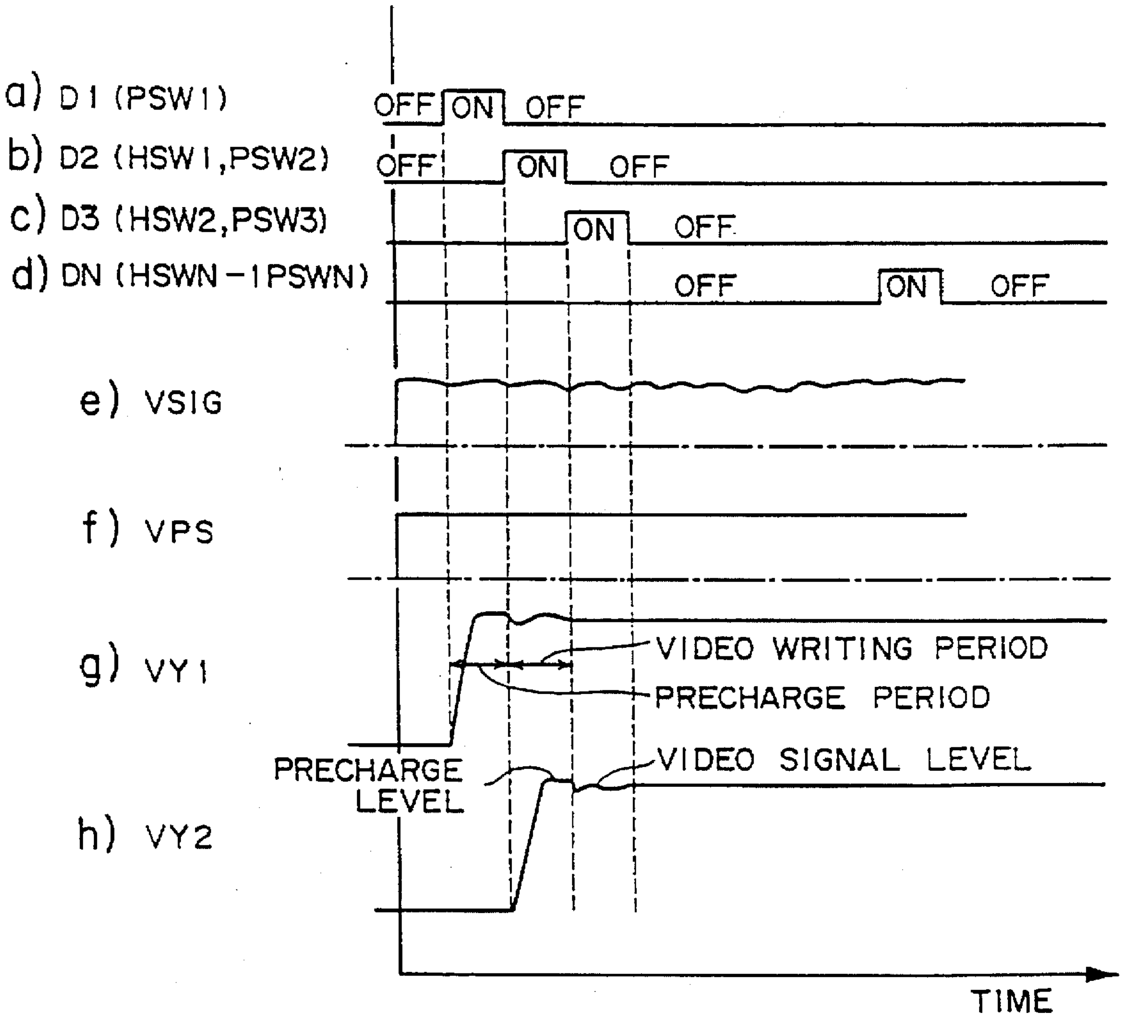
FIG. 4 is a timing chart illustrating the operation of the second preferred embodiment.

Referring now to the timing chart shown in FIG. 4, the operation of the second embodiment shown in FIG. 3 will be described in detail. At first, as the H driver 2 outputs the first sampling pulse D1, PSW1 is controlled to assume one of its ON/OFF states. Subsequently, as the second sampling pulse D2 is outputted, HSW1 and PSW2 are concurrently controlled to their respective ON/OFF states. Therefore, the first signal line Y1 causes PSW1 to be driven to its ON/OFF state, followed by HSW1 being driven for its ON/OFF state. In addition, as the third sampling pulse D3 is outputted, HSW2 and PSW3 are concurrently driven to their ON/OFF state. Lastly, as DN is outputted, HSWN-1 and PSWN are concurrently driven to their respective ON/OFF state. The video signal VSIG supplied from the video line 3 and the precharging signal VPS supplied from the precharging line 6, are sampling held at each of the signal lines Y in response to the switching elements HSW and PSW being induced to assume their respective ON/OFF states. The potential VY1 appearing on the first signal line causes VPS to be sampling held during a precharging period during which PSW1 is ON and subsequently VSIG is sampled for a video writing period in which HSW1 becomes ON. In addition, VY2 appearing on the second signal line causes the precharging level to be written while PSW2 is ON and results in the video signal level being written at a timing in which HSW2 subsequently becomes ON.

As described above, in accordance with this embodiment, the charging or discharging for the signal line Y is partially completed through the precharging line 6, and the charging or discharging through the video line 3 merely corresponds to the remaining difference between the precharging level (VPS) and the video signal level (VSIG). Accordingly, the potential fluctuation of the video line 3 can be reduced and the vertical fixed pattern can be improved. In this second embodiment, although the sampling pulse for driving PSW is taken from the stage before the H driver 2, the present invention is not limited to this configuration. As long as the time band is of one in which the polarity of the video signal does not change, it is possible that the sampling pulse can be taken from any of the stages before the H driver 2. In this embodiment, since the precharging is carried out by dot sequential scanning for each of the signal lines, no detrimental effect on the video quality caused by writing of the precharging signal VPS to all of the signal lines at the same time, is evident. This should be compared with the situation wherein the precharging signals are all sampling held on all signal lines simultaneously, which causes the potential of the gate signal to fluctuate due to a capacitance coupling effect, resulting in that a leak of the video signals written into the liquid crystal pixels may occur and cause a shading or a lateral stripe to be generated. In the worst case, a lack of bright point may occur in the case of normal white mode due to a leakage of electrical load written into it. Not only potential fluctuation at the gate lines can be restricted, but also no fluctuation occurs at the power source line or the earth line and an operating margin is expanded. In addition, since the capacity as viewed from the precharging line 6 is reduced, a design margin can be expanded. With such an arrangement as above, a high quality video can be obtained while the driving margin can be additionally expanded.

Figure 5:
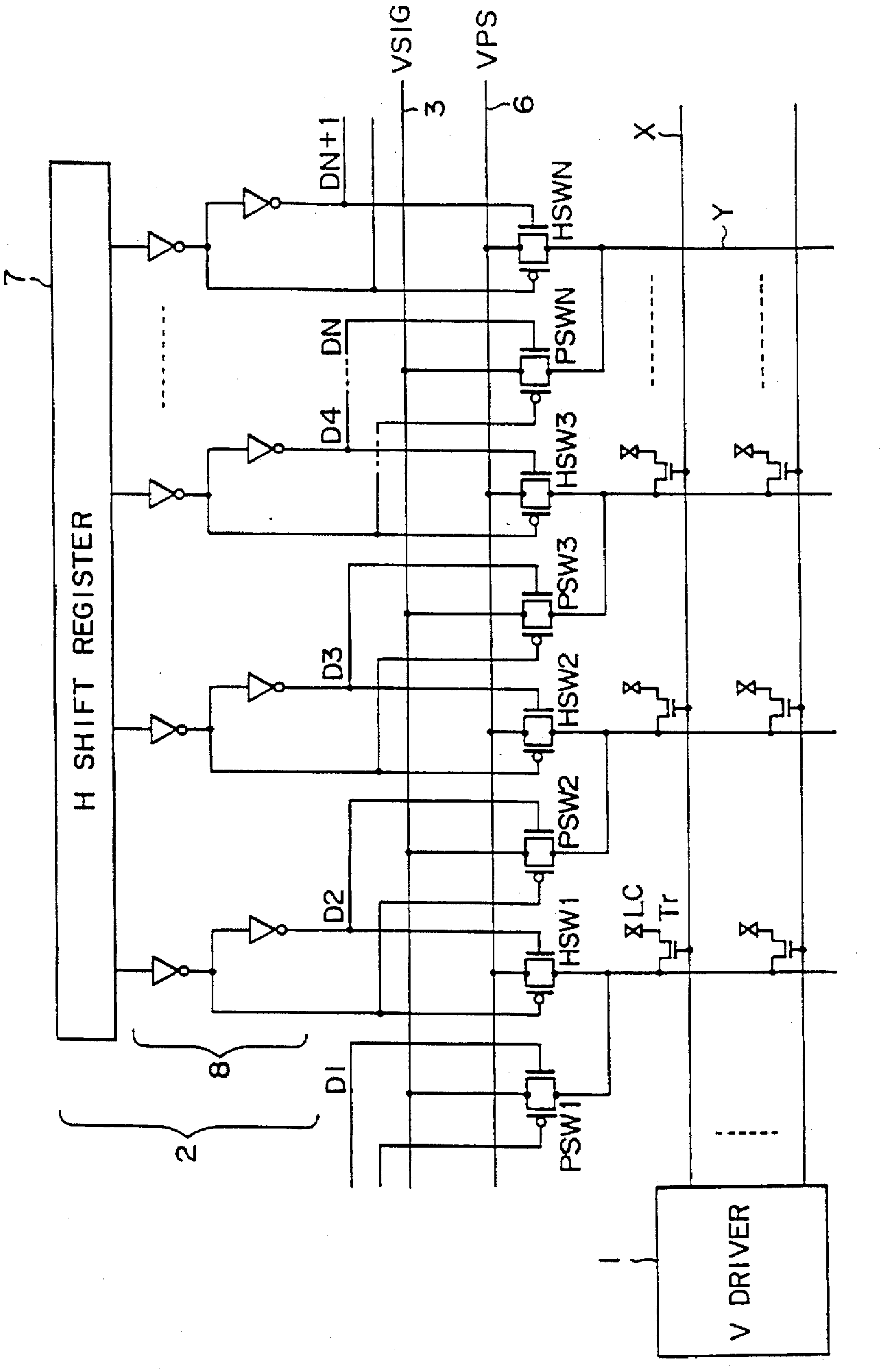
FIG. 5 is a circuit diagram showing an example of an actual circuit configuration of the second preferred embodiment.

FIG. 5 is a circuit diagram illustrating a circuit arrangement of the second preferred embodiment shown in FIG. 3. As shown in this figure, HSW and PSW take the form of transmission gates. In addition, the H driver 2 is comprised of the H shift register 7 and the output gate 8, and is connected to each of the stages. The output gate 8 forms the sampling pulse and its reversing pulse in response to the output of the H shift register 7 so as to control the ON/OFF states of each of HSW and PSW. As described above, the sampling pulse applied to PSW is supplied from one stage before the H shift register 7, so that the point sequential sampling hold of the precharging signal VPS is carried out prior to the point sequential sampling of the video signal VSG.

Figure 6:
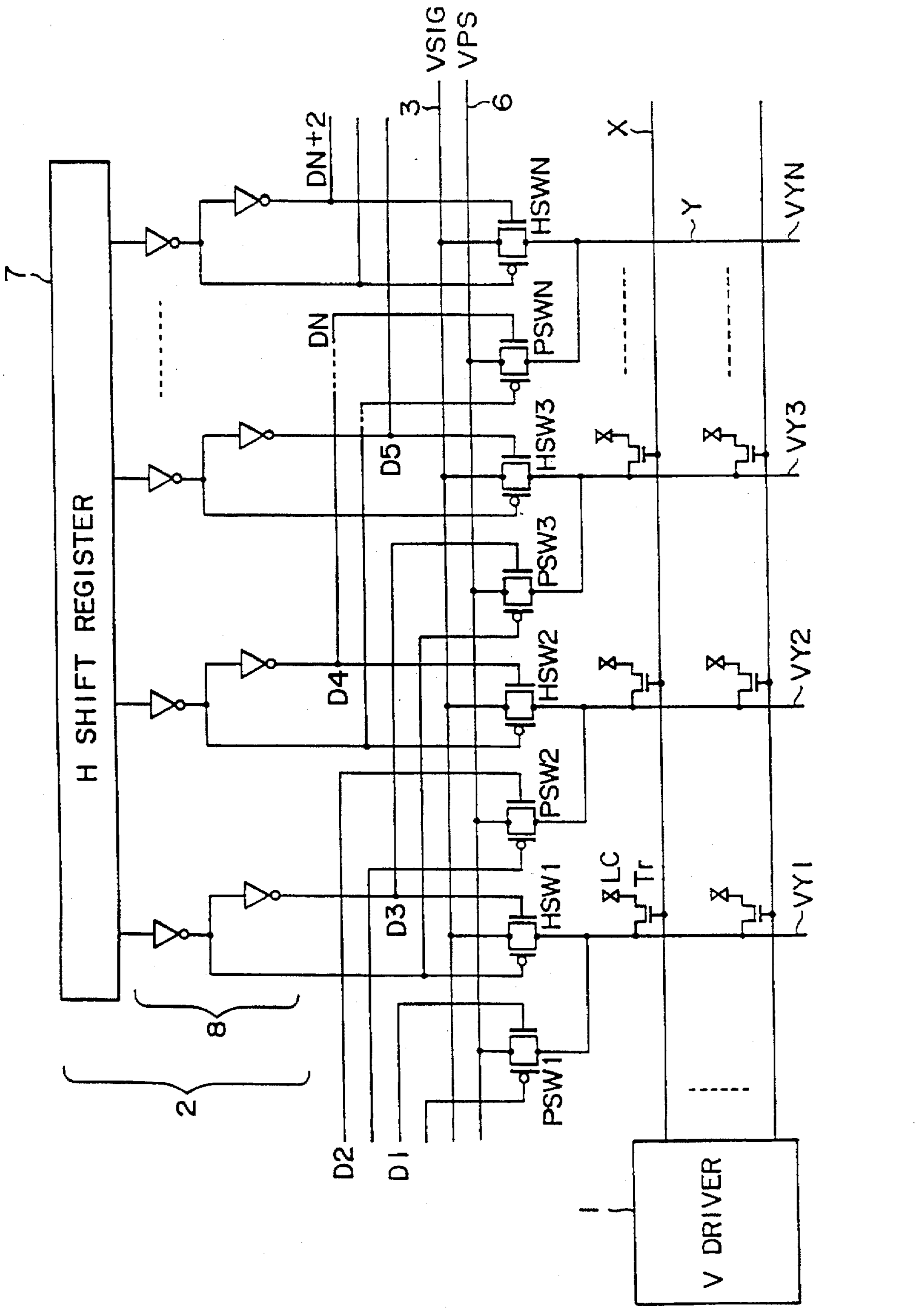
FIG. 6 is a circuit diagram showing another circuit configuration which can be used in the second embodiment.

FIG. 6 shows a modified form of the preferred embodiment shown in FIG. 5, wherein some corresponding reference numerals are applied to the corresponding portions so as to facilitate its understanding. The basic configuration is similar to that of the preferred embodiment shown in FIG. 5. The different points are that the sampling pulse to be applied to PSW is not one before the stage, but supplied from the H shift register 7 of two stages before. In general, if there is a time in which polarities of VSIG and VPS are not reversed, the sampling pulse applied to PSW may be taken before any stages of the H shift register.

Figure 7:
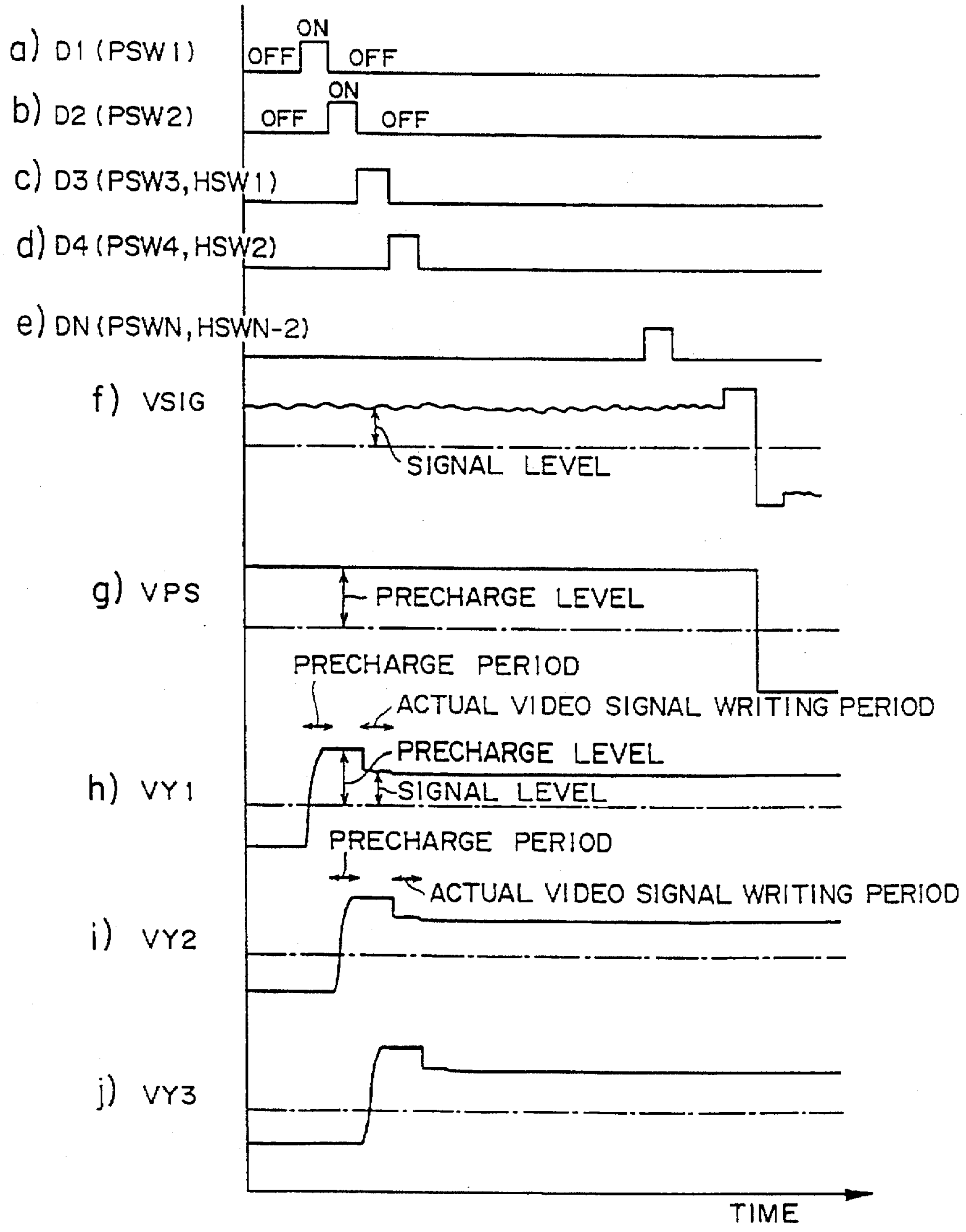
FIG. 7 is a timing chart illustrating the operation of the circuit configuration shown in FIG. 6.
Figure 8:
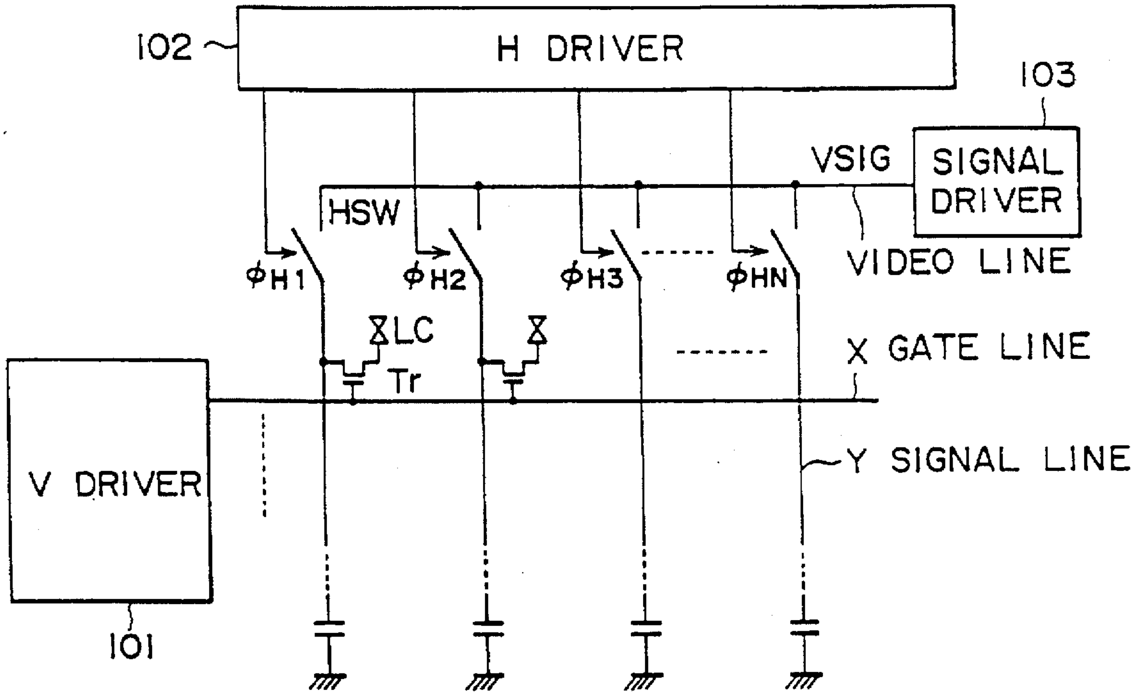
FIG. 8 (PRIOR ART)
FIG. 8 is a circuit diagram showing the circuit configuration of the prior art active matrix display device.
Figure 9:
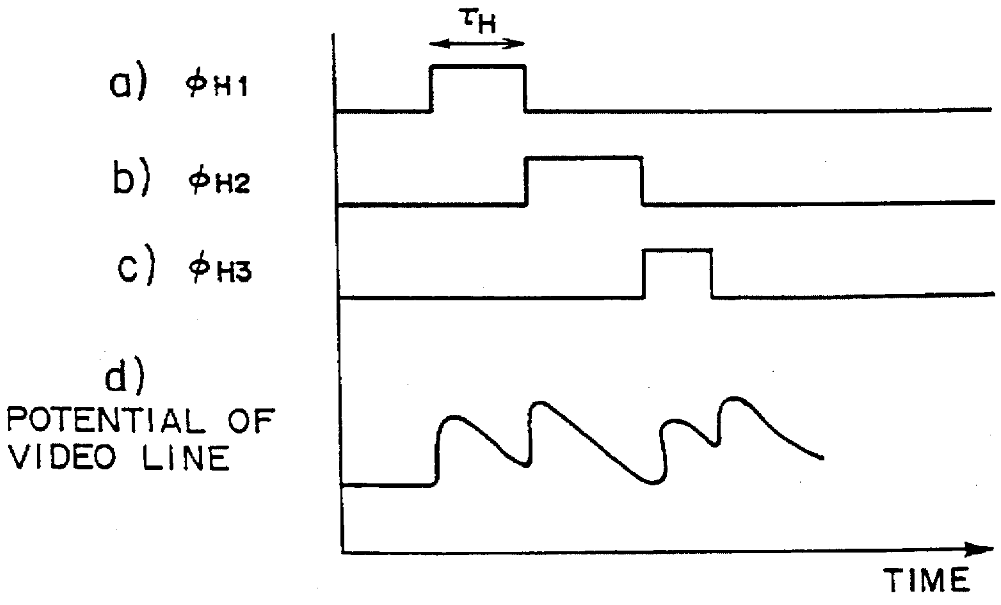
FIG. 9 (PRIOR ART)
FIG. 9 is a waveform diagram illustrating the problem encountered with the prior art arrangement depicted in FIG. 8.

Lastly, referring now to FIG. 7, operation of the preferred embodiment shown in FIG. 6 will be described in detail. As described above, the sampling pulses D1, D2, D3, D4, . . . DN are outputted in sequence from the H register 7 through the output gate 8. When D1 is outputted, PSW1 is turned ON. Then, when D2 is outputted, PSW2 is turned ON. Subsequently, when D3 is outputted, PSW3 and HSW1 are turned ON. In addition, when D4 is outputted, PSW4 and HSW2 are turned ON. Lastly, when DN is outputted, PSWN and HSWN-2 are turned ON. In turn, VSIG has a waveform in which the signal level is changed in response to a video signal. In the preferred embodiment above, since 1H reversing driving is carried out, so that its polarity is reversed for every 1H. In compliance with this operation, VPS having a predetermined precharging level is also reversed for every 1H.

Taking into account the potential VY1 appearing at the first signal line shows that a precharging level is written for a precharging period in which D1 is outputted and PSW1 is turned ON. Subsequently, after elapsing 1 sampling timing, the signal level is sampling held during a period of writing actual video signal in which HSW1 is turned ON in response to the output of D3. In this case, a charging or a discharging amount of the first signal line becomes a difference between the precharging level and the signal level and it can be restricted low. In particular, the aforesaid difference is almost eliminated in the case that the same waveform as that of the video signal VSIG is used as the precharging signal PS. Then, taking into account the potential VY2 appearing at the second signal line shows that the precharging level is written during a precharging period in which PSW2 is turned ON in response to D2, and the signal level is sampling held during an actual video signal writing period in which HSW2 is turned ON in response to D4 in 1 sampling timing. The potential VY3 appearing at the third signal line is also similarly processed.

As described above, according to the present invention, predetermined precharging signals are supplied in sequence prior to the sequential sampling of the video signals for each of the signal lines so as to attenuate the amount of charging or discharging which occurs at each of the signal lines as a result of the sampling. With an arrangement such as described above, since the potential oscillation in the video line (noise) is substantially reduced, it has an effect that the vertical fixed pattern can be removed from the displayed image. Since the precharging is carried out by dot sequential scanning, the shooting or lateral stripe pattern can be attenuated and similarly the image quality can be improved. Further, an operating margin can be expanded and potential oscillation at the power source line or the earth line is not observed. Since the vertical fixed pattern can be removed by the pre-charging, it not necessary to consider the problem of minute disturbance of the sampling pulse width and that the design margin of the horizontal scanning circuit is expanded. The power source voltage and power consumption can also be reduced.

What is claimed is:

1. An active matrix display device comprising:
   - a plurality of gate lines arranged in rows;
   - a plurality of signal lines arranged in columns;
   - pixels arranged at each crossing point of said gate lines and signal lines;
   - a vertical scanning circuit for scanning each of the gate lines in sequence and selecting pixels of at least one gate line;
   - a horizontal scanning circuit for sampling video signals in sequence and writing the video signals in sequence in the pixels in selected signal line; and
   - a precharging circuit for sequentially supplying precharging signals in sequence to each of the signal lines prior to a sequential sampling of video signals to each of the signal lines.

2. An active matrix display device according to claim 1, in which said precharging circuit comprises:
   - a plurality of switching elements each connected to an end part of a signal line, and
   - a control circuit for sequentially controlling the switching elements to supply a precharging signal to each of the signal lines.

3. An active matrix display device according to claim 2, in which said control circuit is an additional horizontal scanning circuit arranged independently of said horizontal scanning circuit.

4. An active matrix display device according to claim 2, wherein said control circuit is incorporated into said horizontal scanning circuit, said control circuit sequentially distributing an ON/OFF control output to each of the switching elements.

5. An active matrix display device according to claim 1, in which said precharging circuit supplies a precharging signal having a grey level with respect to a video signal varying between a white level and a black level.

6. An active matrix display device according to claim 1, in which said precharging circuit supplies a precharging signal which has the same polarity as that of the video signal.

7. An active matrix display device according to claim 1, in which said precharging circuit is arranged on a side of the active matrix display device opposite to a side of the active matrix display device on which said horizontal scanning circuit is arranged.

8. A method for driving an active matrix device according to claim 7, in which said precharging signal has the same polarity as that of the video signal and has a grey level.

9. An active matrix display device according to claim 1, in which said precharging circuit and said horizontal scanning circuit are arranged on the same side of said active matrix display device.

10. A method for driving an active matrix device comprising gate lines arranged in rows, a plurality of signal lines arranged in columns, and pixels arranged at the crossing parts between said gate lines and signal lines, comprising the following steps of:

line scanning in sequence of each of the gate lines and selecting pixels for at least one row;

sampling in sequence the video signals and writing the video signals by dot sequential scanning to the pixels in one selected row; and sequentially providing a precharging signal to each of the signal lines in sequence prior to a sequential sampling of the video signal for each of the signal lines.

11. An active matrix display device operatively connected with a source of video signal, and a source of precharge voltage, comprising:

a plurality of gate lines arranged in rows;

a plurality of signal lines arranged in columns;

a matrix of pixels wherein each pixel is operatively interconnected with a gate line and a signal line;

a vertical scanning circuit for scanning the gate lines;

a horizontal scanning circuit for scanning the signal lines and for sequentially writing the video signal to one signal line at time so as to perform, in combination with the vertical scanning, a dot sequential scanning of the pixels; and switch means for sequentially selecting and supplying the precharging voltage to one signal line at a time and in a manner wherein the signal line, to which the precharge voltage is supplied, is immediately adjacent a signal line to which the video signal is being written.

* * * * *